(12) United States Patent
Kim et al.

(10) Patent No.: US 12,526,609 B2
(45) Date of Patent: Jan. 13, 2026

(54) COMMUNICATION METHOD BY MEANS OF MULTICAST

(71) Applicant: LG Electronics Inc., Seoul (KR)

(72) Inventors: Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 407 days.

(21) Appl. No.: 18/008,529

(22) PCT Filed: Jun. 30, 2021

(86) PCT No.: PCT/KR2021/008280
§ 371 (c)(1),
(2) Date: Dec. 6, 2022

(87) PCT Pub. No.: WO2022/005207
PCT Pub. Date: Jan. 6, 2022

(65) Prior Publication Data
US 2023/0345210 A1  Oct. 26, 2023

(30) Foreign Application Priority Data
Jul. 1, 2020 (KR) .................. 10-2020-0081045

(51) Int. Cl.
H04H 20/71 (2008.01)
H04W 4/08 (2009.01)
H04W 88/04 (2009.01)

(52) U.S. Cl.
CPC .............. *H04W 4/08* (2013.01); *H04W 88/04* (2013.01)

(58) Field of Classification Search
USPC ....................................................... 370/312
See application file for complete search history.

(56) References Cited

U.S. PATENT DOCUMENTS

2016/0344566 A1*  11/2016  Pudney ................. H04L 12/189
2020/0100325 A1    3/2020  Chang
(Continued)

FOREIGN PATENT DOCUMENTS

KR    20180038007    4/2018
KR    20190021679    3/2019

OTHER PUBLICATIONS

3GPP, "3rd Generation Partnership Project; Technical Specification Group Services and System Aspects; Study on architectural enhancements for 5G multicast-broadcast services (Release 17)," TR 23.757 V0.4.0, Jun. 2020, 157 pages.

*Primary Examiner* — Chuong T Ho
(74) *Attorney, Agent, or Firm* — Fish & Richardson P.C.

(57) ABSTRACT

One disclosure of the present specification provides a method by which a Session Management Function (SMF) provides a multicast service. The SMF performs the steps of: receiving a first message from a relay user equipment (UE), wherein on the basis of the relay UE receiving a join request of a first remote UE for a multicast group from the first remote UE, the first message includes (i) the join request of the first remote UE and (ii) information about the first remote UE, and on the basis of the relay UE wanting to join the multicast group by itself, the first message includes a join request of the relay UE; checking whether the join request included in the first message is a first join request for the multicast group from among the relay UE and one or more remote UEs receiving a network connection service from the relay UE.

9 Claims, 16 Drawing Sheets

(56) References Cited

U.S. PATENT DOCUMENTS

| | | |
|---|---|---|
| 2020/0163005 A1 | 5/2020 | Rao et al. |
| 2021/0127343 A1* | 4/2021 | Mladin ................. H04W 76/14 |
| 2022/0225448 A1* | 7/2022 | Li ......................... H04W 8/005 |
| 2022/0322202 A1* | 10/2022 | Li ......................... H04M 15/93 |
| 2022/0329986 A1* | 10/2022 | Xie ....................... H04L 65/611 |
| 2023/0188949 A1* | 6/2023 | Jia ........................ H04W 76/12 |
| | | 455/458 |

\* cited by examiner

COMMUNICATION METHOD BY MEANS OF MULTICAST

CROSS-REFERENCE TO RELATED APPLICATIONS

This application is a National Stage application under 35 U.S.C. § 371 of International Application No. PCT/KR2021/008280, filed on Jun. 30, 2021, which claims the benefit of Korean Patent Application No. 10-2020-0081045, filed on Jul. 1, 2020. The disclosures of the prior applications are incorporated by reference in their entirety.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In providing a multicast service to a relay UE and a remote UE, a join request and a leave request for a multicast group of a remote UE(s), which provide a network connection service from the relay UE and the relay UE for efficient communication, need to be managed in an integrated way. At this time, the subject of integrated management is not discussed in the prior art, which is a problem.

SUMMARY

The SMF may manage a relay UE and a remote UE for a multicast service, and may transmit a context for multicast to the base station.

The specification may have various effects.

For example, through the procedures disclosed in this specification, 5GS may also provide support for multicast services to Remote UEs receiving network connection services through UE-to-Network Relay.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

DETAILED DESCRIPTION

Figure 1:
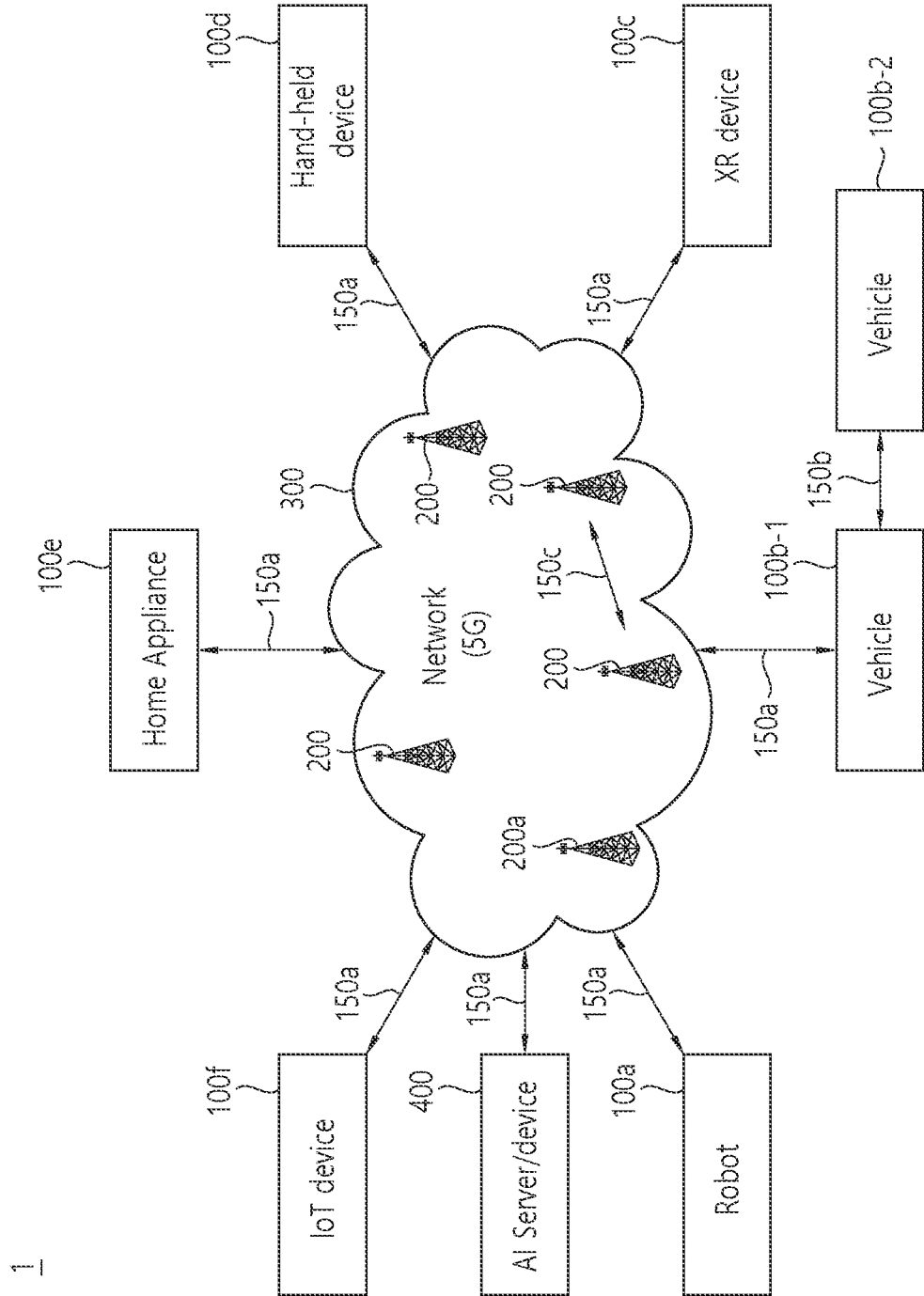
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A. B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A. B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR. AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 KHz |
| FR2 | 24250 MHz-52600 MHZ | 60, 120, 240 KHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHZ | 60, 120, 240 KHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M. and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
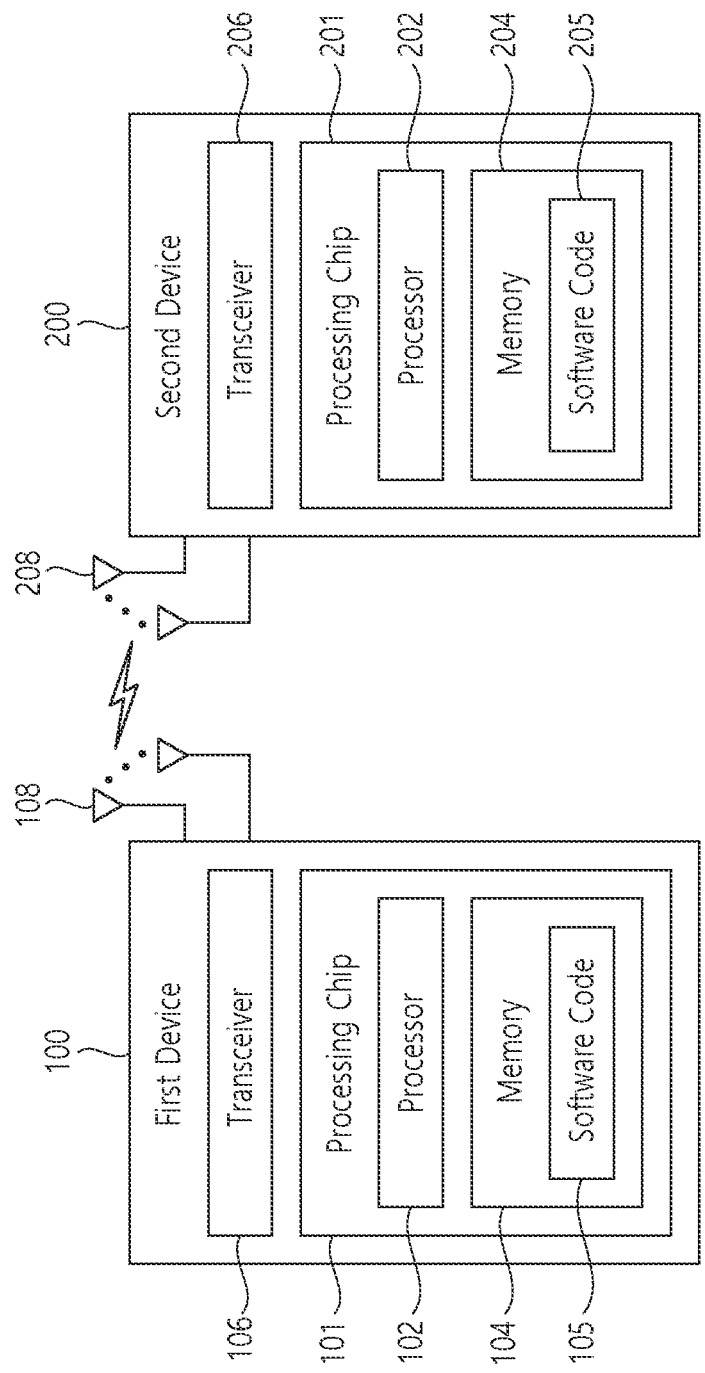
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of (the wireless device 100a to 100f and the BS 200), {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
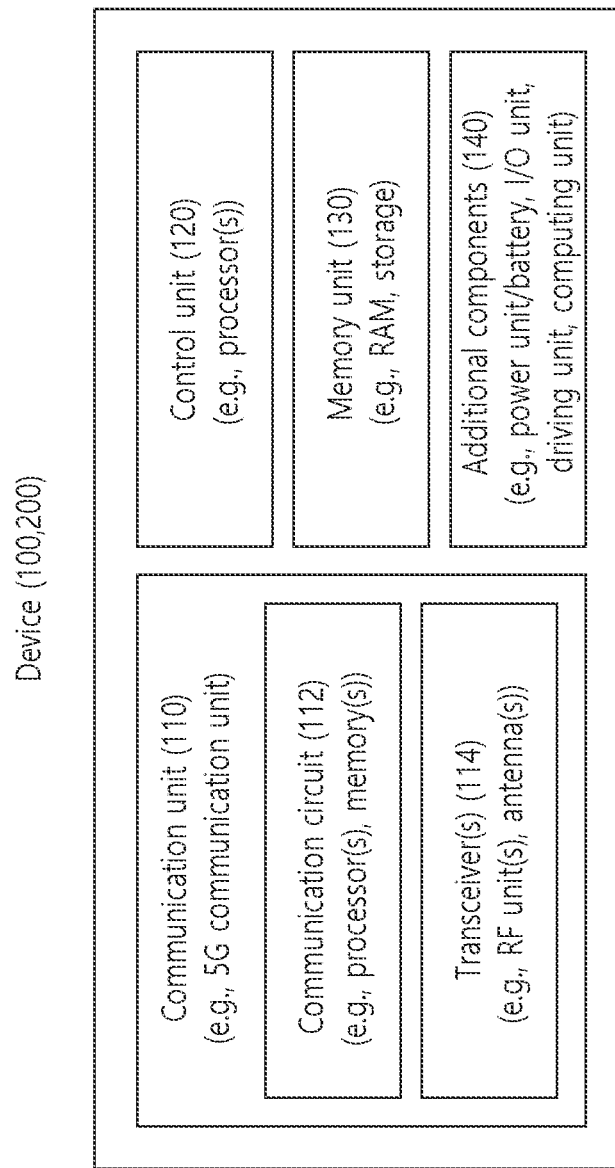
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
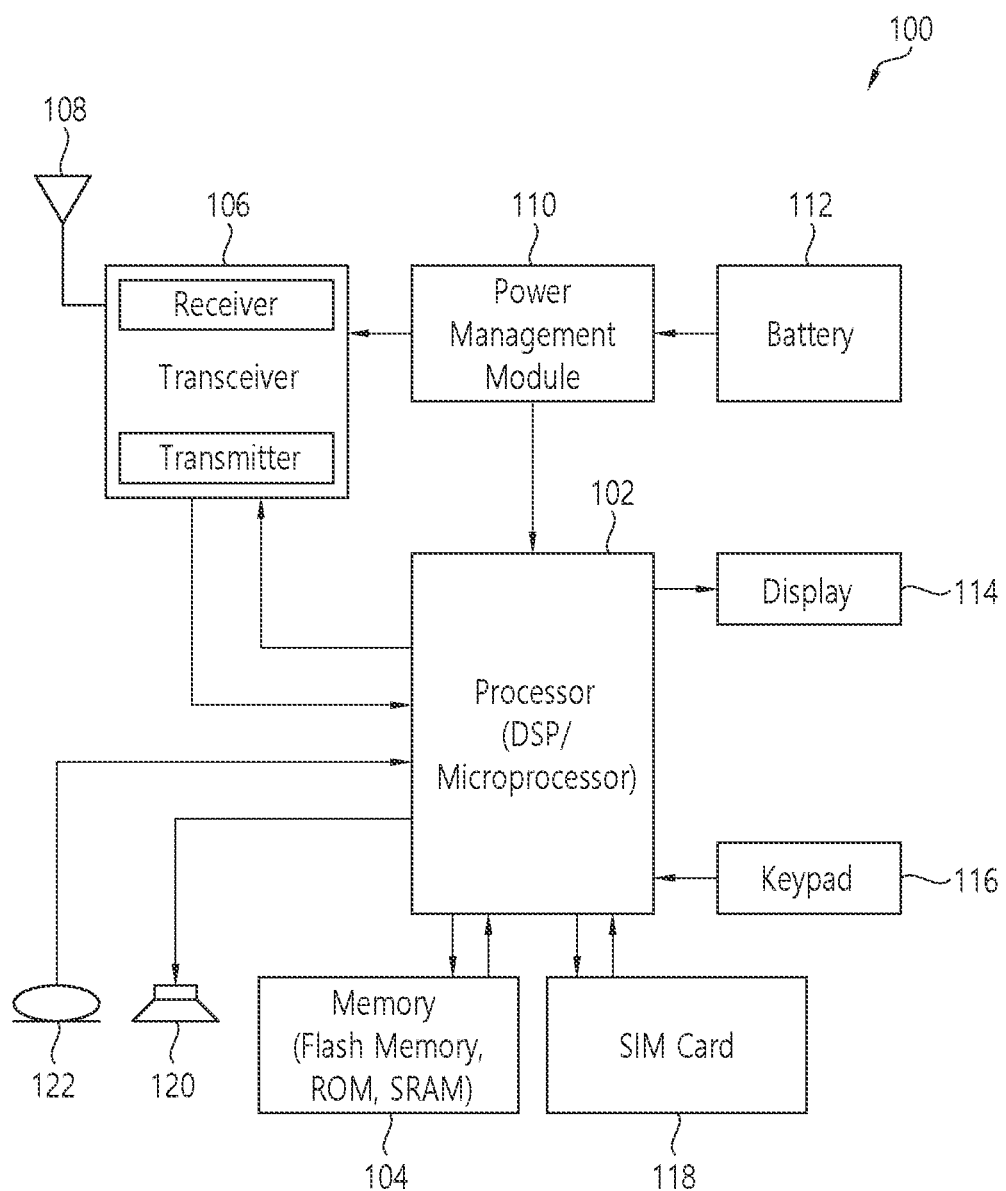
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm™, EXYNOS™ series of processors made by Samsung®, a series of processors made by Applet, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
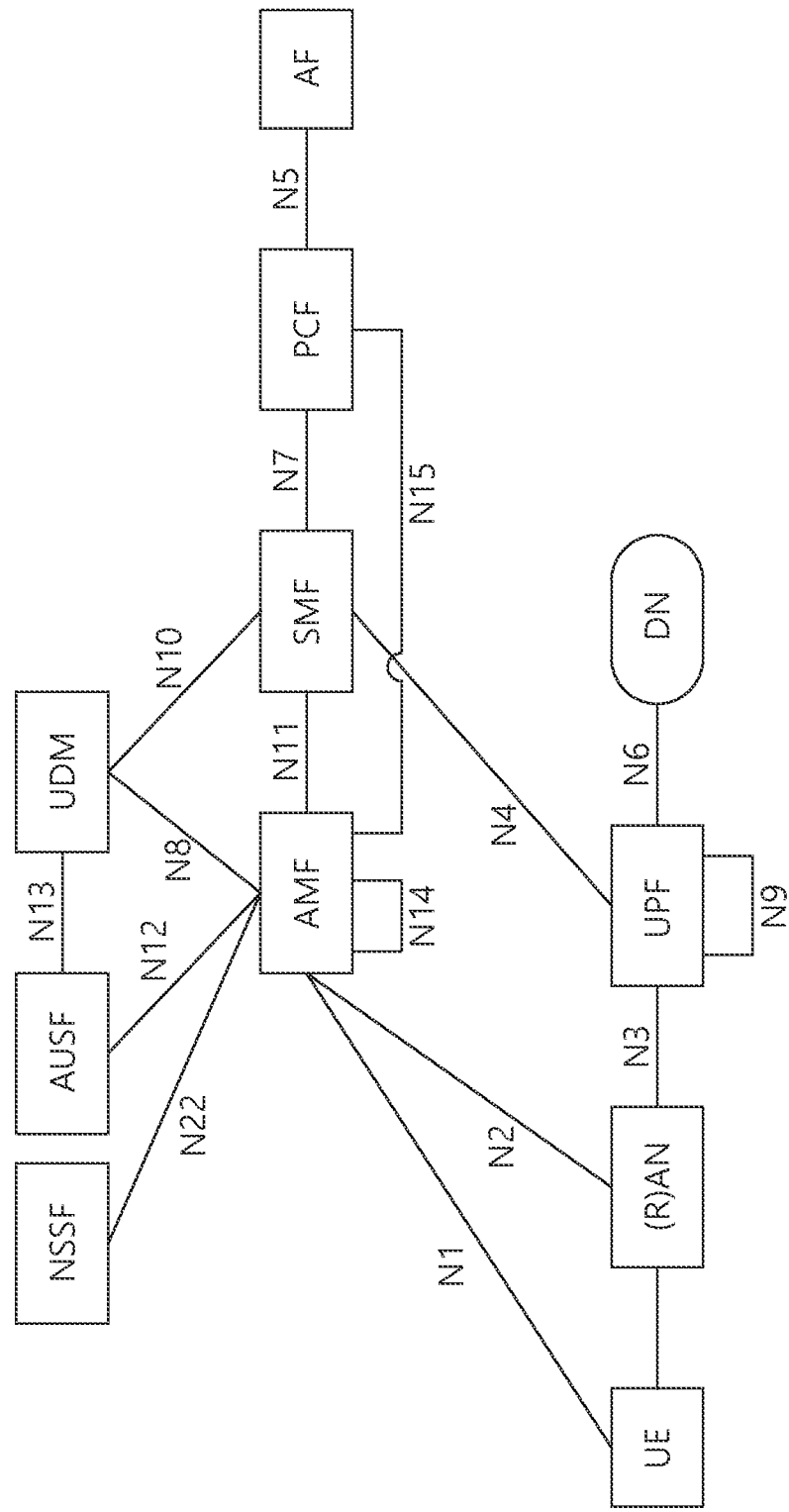
FIG. 5 shows an example of a 5G system architecture to which the implementation of the present specification is applied.

FIG. 5 shows an example of a 5G system architecture to which the implementation of the present specification is applied.

The 5G system (5GS; 5G system) structure consists of the following network functions (NFs).
  AUSF (Authentication Server Function)
  AMF (Access and Mobility Management Function)
  DN (Data Network), e.g., operator services, internet access or third-party services
  USDF (Unstructured Data Storage Function)
  NEF (Network Exposure Function)
  I-NEF (Intermediate NEF)
  NRF (Network Repository Function)
  NSSF (Network Slice Selection Function)
  PCF (Policy Control Function)
  SMF (Session Management Function)
  UDM (Unified Data Management)
  UDR (Unified Data Repository)
  UPF (User Plane Function)
  UCMF (UE radio Capability Management Function)
  AF (Application Function)
  UE (User Equipment)
  (R)AN ((Radio) Access Network)
  5G-EIR (5G-Equipment Identity Register)
  NWDAF (Network Data Analytics Function)
  CHF (Charging Function)

In addition, the following network functions may be considered.
  N3IWF (Non-3GPP InterWorking Function)
  TNGF (Trusted Non-3GPP Gateway Function)
  W-AGF (Wireline Access Gateway Function)

FIG. 5 shows the 5G system structure of a non-roaming case using a reference point representation that shows how various network functions interact with each other.

In FIG. 5, UDSF, NEF and NRF are not described for clarity of the point-to-point diagram. However, all network functions shown may interact with UDSF, UDR, NEF and NRF as needed.

For clarity, the connection between the UDR and other NFs (e.g., PCFs) is not shown in FIG. 5. For clarity, the connection between NWDAF and other NFs (e.g. PCFs) is not shown in FIG. 5.

The 5G system architecture includes the following reference points.
  N1: the reference point between the UE and the AMF.
  N2: reference point between (R)AN and AMF.
  N3: Reference point between (R)AN and UPF.
  N4: reference point between SMF and UPF.
  N6: Reference point between UPF and data network.
  N9: reference point between two UPFs.

The following reference points show the interactions that exist between NF services in NF.
  N5: Reference point between PCF and AF.
  N7: reference point between SMF and PCF.
  N8: reference point between UDM and AMF.
  N10: reference point between UDM and SMF.
  N11: reference point between AMF and SMF.
  N12: reference point between AMF and AUSF.
  N13: reference point between UDM and AUSF.
  N14: reference point between two AMFs.
  N15: Reference point between PCF and AMF in case of non-roaming scenario, and reference point between PCF and AMF of visited network in case of roaming scenario.
  N16: reference point between two SMFs (in case of roaming, between the SMF of the visited network and the SMF of the home network)
  N22: reference point between AMF and NSSF.

In some cases, it may be necessary to connect two NFs to each other to service the UE.

V2X (vehicle-to-everything) communication will be described. For V2X communication, the definition below may be used.
  V2X applications: V2X applications is applications that use one or more V2X services (e.g., active safety applications in vehicles, emergency warnings, vehicle safety and awareness, etc.). V2X applications may operate towards the V2X application server.
  V2X communication: It is communication to support V2X service by utilizing Uu and/or PC5 reference point. V2X services are implemented through various types of V2X applications, such as vehicle-to-vehicle (V2V), vehicle-to-pedestrian (V2P), vehicle-to-infrastructure (V2I), and vehicle-to-network (V2N).

V2X message: It is a dedicated messaging type (e.g., ITS (intelligent transport system) message) for V2X service.

V2X service: it is a data service provided to a V2X application and optionally a V2X application server. V2X service belongs to one V2X service type. A V2X service may be connected to one or more V2X applications, and a V2X application may be connected to one or more V2X services.

V2X service type: It is a V2X service type identified by ITS-AID (ITS application identifier) or PSID (provider service identifier).

V2X communication has two operation modes: V2X communication through PC5 reference point and V2X communication through Uu reference point. These two operating modes can be used independently by the UE for transmission and reception.

V2X communication through PC5 reference point is supported by LTE and/or NR.

V2X communication through Uu reference point is supported by E-UTRA connected to 5GC and/or NR connected to 5GC. V2X communication through the Uu reference point may be unicast only.

<UE-to-Network Relay>

Figure 6:
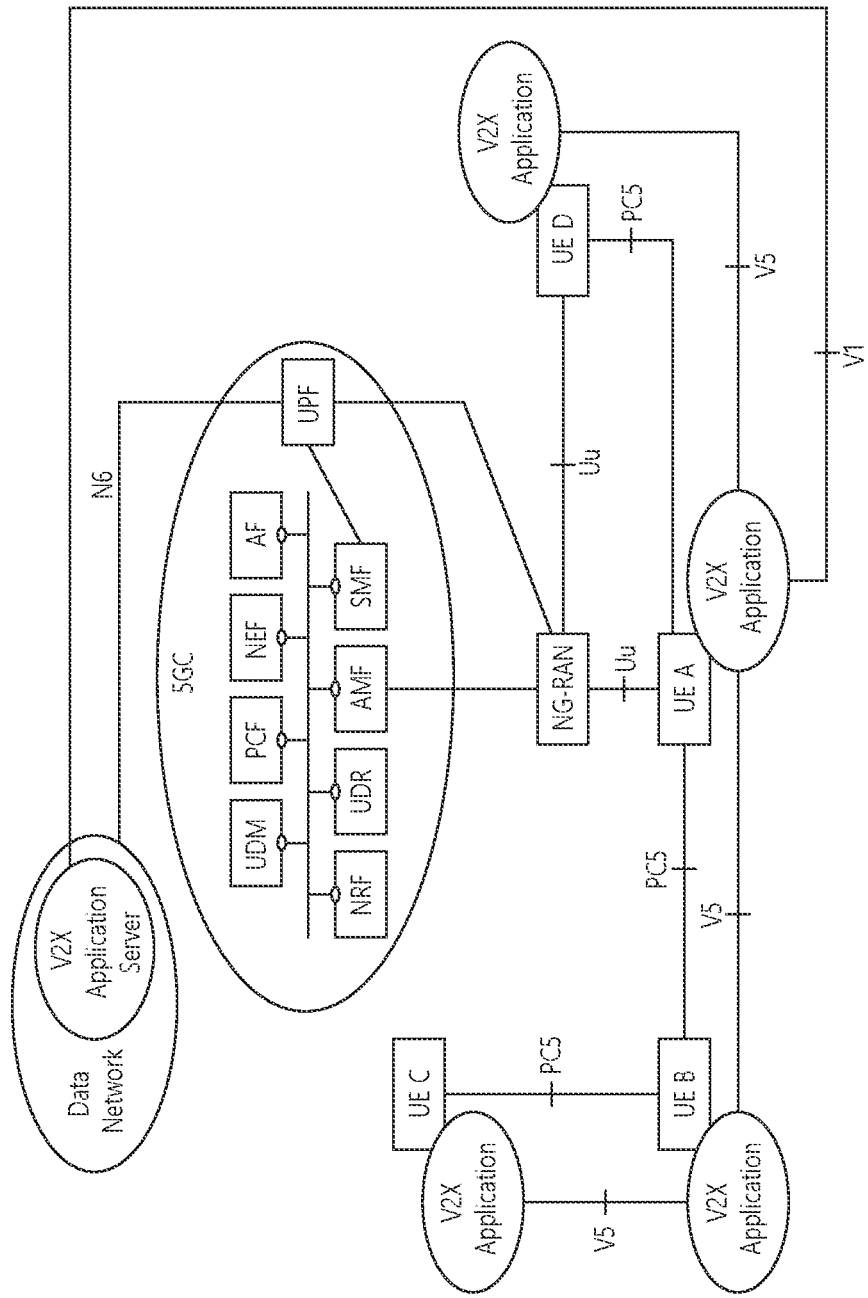
FIG. 6 shows an example of a 5G system structure for V2X communication to which the implementation of the present specification is applied.

FIG. 6 shows an example of a 5G system structure for V2X communication to which the implementation of the present specification is applied.

Referring to FIG. 6, the 5G system structure for V2X communication includes the following reference points.

V1: the reference point between the V2X application of the UE and the V2X application server.

V5: a reference point between V2X applications of the UE.

PC5: a reference point between UEs, including LTE-based PC5 and/or NR-based PC5.

N1: For V2X service, it is used to deliver V2X policies and parameters (including service approval) from AMF to UE, and to deliver V2X function and PC5 function of UE for V2X information from UE to AMF.

N2: For V2X service, it is used to deliver V2X policies and parameters (including service approval) from AMF to NG-RAN.

Uu: the reference point between the UE and the NG-RAN.

Figure 7:
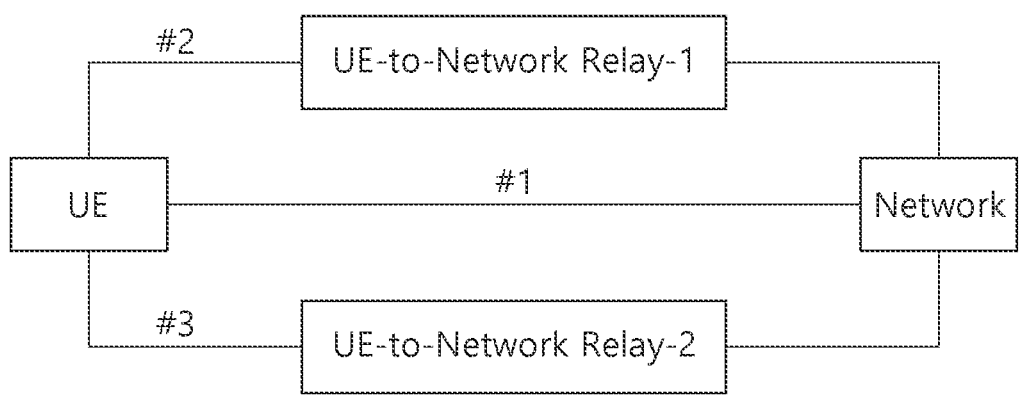
FIG. 7 shows an example of a direct or indirect network communication path between a terminal and a network.

FIG. 7 shows an example of a direct or indirect network communication path between a terminal and a network.

The terminal may communicate directly with the network and may communicate indirectly. The terminal may indirectly communicate with the network through other terminals (UE-to-Network Relay-1, UE-to-Network Relay-2).

5G ProSe (Proximity based services) may support UE-to-Network Relay.

The following are studied.

How to authorize a UE to be a 5G UE-to-Network Relay and how to authorize a UE to access 5GC via a 5G UE-to-Network Relay.

How to establish a connection between Remote UE and a UE-to-Network Relay to support connectivity to the network for the Remote UE.

How to support end-to-end requirements between Remote UE and the network via a UE-to-Network Relay, including QoS (such as data rate, reliability, latency) and the handling of PDU Session related attributes (e.g., S-NSSAI. DNN, PDU Session Type and SSC mode).

How the network allows and controls the QoS requirement for 5G ProSe UE-to-NW relay.

How to transfer data between the Remote UE and the network over the UE-to-Network Relay.

NOTE 1: Security and privacy aspects will be handled by SA WG3.

How to (re)select a UE-to-Network Relay for communication path selection between two indirect network communication paths (i.e., path #2 and path #3 in FIG. 7).

How to perform communication path selection between a direct network communication path (i.e., path #1 in FIG. 7) and an indirect network communication path (i.e., path #2 or path #3 in FIG. 7).

How to guarantee service continuity during these communication path switch procedures for switching between a direct network communication path and an indirect communication path, as well as for switching between two indirect network communication paths.

NOTE 2: Support of non-unicast mode communication (i.e., one-to-many communication/broadcast or multicast) between network and UE-to-Network Relay UE and between UE-to-Network Relay and Remote UE(s) depends on the result of FS_5MBS work.

Figure 8:
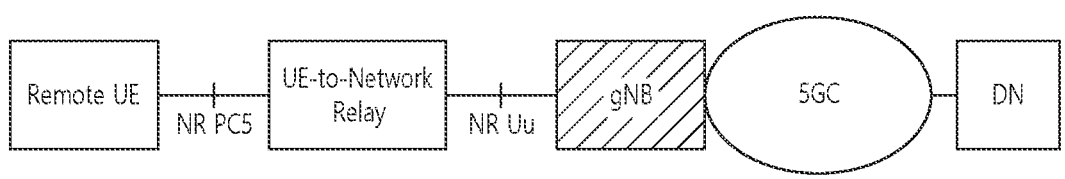
FIG. 8 shows a UE-to-Network Relay serviced by a gNB.
Figure 9:
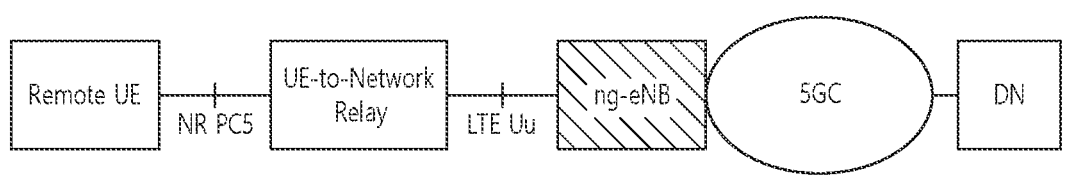
FIG. 9 shows a UE-to-Network Relay serviced by ng-eNB.

In relation to UE-to-Network Relay support, the cases of FIGS. 8 and 9 may be considered.

FIG. 8 shows a UE-to-Network Relay serviced by a gNB.

FIG. 9 shows a UE-to-Network Relay serviced by ng-eNB.

Whether or not UE-to-Network Relay supports the case served by ng-eNB may vary depending on the solution and RAN decision.

Figure 10:
FIG. 10 shows an architecture model using ProSe 5G UE-to-Network Relay.

FIG. 10 shows an architecture model using ProSe 5G UE-to-Network Relay.

Referring to FIG. 10, a ProSe 5G UE-network relay entity (or ProSe 5G UE-network relay UE, or simply ProSe UE-network relay entity/UE, UE-network relay entity/UE) provides the functionality to support connectivity to the network for Remote UEs. It can be used for both public safety services and commercial services (e.g., interactive service).

A UE is considered to be a Remote UE for a certain ProSe UE-to-Network relay if it has successfully established a PC5 link to this ProSe 5G UE-to-Network Relay. A Remote UE can be located within NG-RAN coverage or outside of NG-RAN coverage.

The ProSe 5G UE-to-Network Relay shall relay unicast traffic (UL and DL) between the Remote UE and the network. The ProSe UE-to-Network Relay shall provide generic function that can relay any IP, Ethernet or Unstructured traffic;

For IP traffic over PC5 reference point, the ProSe UE-to-Network Relay uses IP type PDU Session towards 5GC.

For Ethernet traffic over PC5 reference point, the ProSe UE-to-Network Relay can use Ethernet type PDU Session or IP type PDU Session towards 5GC.

For Unstructured traffic over PC5 reference point, the ProSe UE-to-Network Relay can use Unstructured type PDU Session or IP type PDU Session (i.e., IP encapsulation/de-capsulation by UE-to-Network Relay) towards 5GC.

The type of traffic supported over PC5 reference point is indicated by the ProSe UE-to-Network Relay e.g. using the corresponding Relay Service Code. The UE-to-Network Relay determines the PDU Session Type based on, e.g. ProSe policy/parameters. URSP rule. Relay Service Code, etc.

IP type PDU Session and Ethernet type PDU Session can be used to support more than one Remote UEs while Unstructured type PDU Session can be used to support only one Remote UE.

One-to-one Direct Communication is used between Remote UEs and ProSe 5G UE-to-Network Relays for unicast traffic.

Hop-by-hop security is supported in the PC5 link and Uu link. If there are requirements beyond hop-by-hop security for protection of Remote UE's traffic, security over PDU layer needs to be applied.

Figure 11:
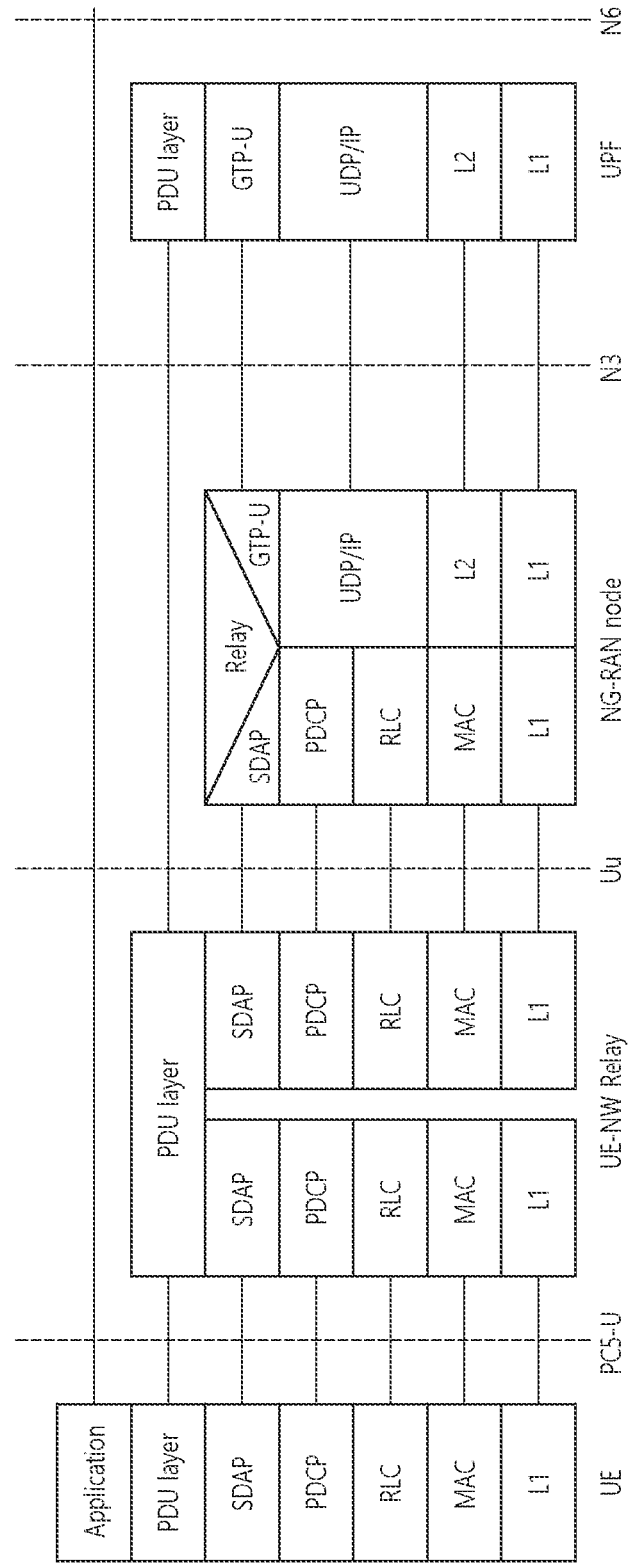
FIG. 11 shows a protocol stack for ProSe 5G UE-to-Network Relay.

The protocol stack of Layer-3 UE-to-Network Relay is shown in FIG. 11.

FIG. 11 shows a protocol stack for ProSe 5G UE-to-Network Relay.

Hop-by-hop security is supported in the PC5 link and Uu link. If there are requirements beyond hop-by-hop security for protection of Remote UE's traffic, security over PDU layer needs to be applied.

Further security details (integrity and privacy protection for remote UE-Nw communication) will be specified in SA WG3.

Figure 12:
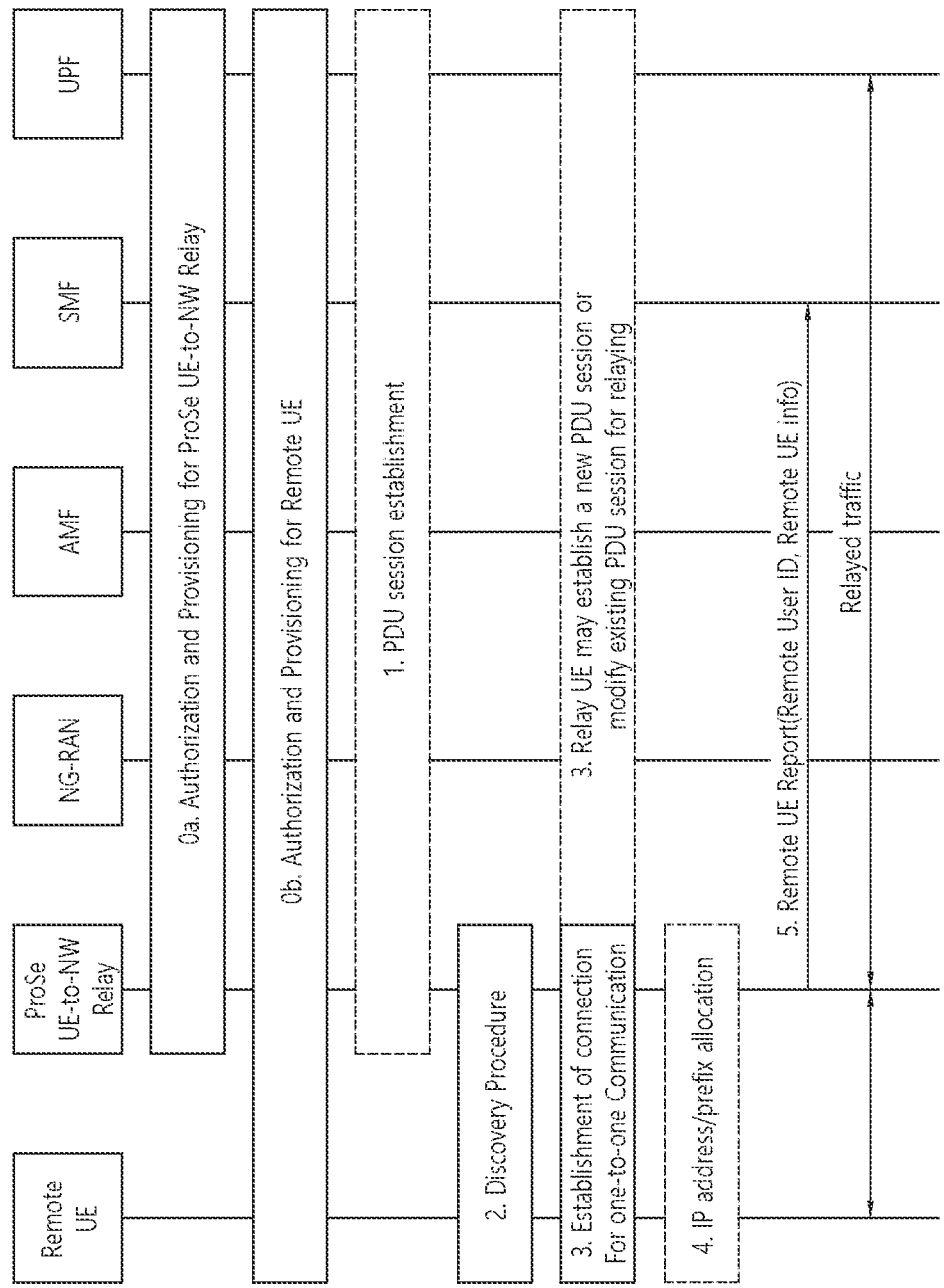
FIG. 12 shows an example of a procedure for ProSe 5G UE-network relay to which the implementation of the present specification is applied.

FIG. 12 shows an example of a procedure for ProSe 5G UE-network relay to which the implementation of the present specification is applied.

A ProSe 5G UE-to-Network Relay capable UE may register to the network (if not already registered) and establish a PDU session enabling the necessary relay traffic, or it may need to connect to additional PDU session(s) or modify the existing PDU session in order to provide relay traffic towards Remote UE(s). PDU session(s) supporting UE-to-Network Relay shall only be used for Remote ProSe UE(s) relay traffic.

Step 0. During the Registration procedure, Authorization and provisioning is performed for the ProSe UE-to-NW relay(0a) and Remote UE(0b).

Step 1. The ProSe 5G UE-to-Network Relay may establish a PDU session for relaying with default PDU session parameters received in step 0 or pre-configured in the UE-to-NW relay, e.g. S-NSSAI. DNN, SSC mode or PDU Session Type. In case of IP PDU Session Type and IPv6, the ProSe UE-to-Network Relay obtains the IPv6 prefix via prefix delegation function from the network.

Step 2. Based on the Authorization and provisioning in step 0, the Remote UE performs discovery of a ProSe 5G UE-to-Network Relay. As part of the discovery procedure the Remote UE learns about the connectivity service the ProSe UE-to-Network Relay provides.

Step 3. The Remote UE selects a ProSe 5G UE-to-Network Relay and establishes a connection for One-to-one ProSe Direct Communication.

If there is no PDU session satisfying the requirements of the PC5 connection with the remote UE, e.g. S-NSSAI, DNN, QoS, the ProSe 5G UE-to-Network Relay initiates a new PDU session establishment or modification procedure for relaying.

According to the PDU Session Type for relaying, the ProSe 5G UE-to-Network Relay performs relaying function at the corresponding layer, e.g., acts as an IP router when the traffic type is IR acts as an Ethernet switch when the traffic type is Ethernet, and performs generic forwarding for Unstructured traffic.

When the ProSe 5G UE-to-Network Relay uses Unstructured PDU session type for Unstructured traffic over PC5 reference point, it creates a mapping between the PC5 Link Identifier and the PDU Session ID, and a mapping between PFI for PC5 L2 link and the QFI for the PDU Session.

When the ProSe 5G UE-to-Network Relay uses IP PDU session type for Ethernet or Unstructured traffic over PC5 reference point, it locally assigns an IP address/prefix for the Remote UE and use that to encapsulate the data from the Remote UE. For downlink traffic, the ProSe 5G UE-to-Network Relay decapsulates the traffic from the IP headers and forwards to the corresponding Remote UE via PC5 reference point.

Step 4. For IP PDU Session Type and IP traffic over PC5 reference point, IPv6 prefix or IPv4 address is allocated for the remote UE. From this point, the uplink and downlink relaying can start. For downlink traffic forwarding, the PC5 QoS Rule is used to map the downlink IP packet to the PC5 QoS Flow. For uplink traffic forwarding, the 5G QoS Rule is used to map the uplink IP packet to the Uu QoS Flow.

Step 5. The ProSe 5G UE-to-Network Relay sends a Remote UE Report (Remote User ID, Remote UE info) message to the SMF for the PDU session associated with the relay. The Remote User ID is an identity of the Remote UE user (provided via User Info) that was successfully connected in step 3. The Remote UE info is used to assist identifying the Remote UE in the 5GC. For IP PDU Session Type, the Remote UE info is Remote UE IP info. For Ethernet PDU Session Type, the Remote UE info is Remote UE MAC address which is detected by the UE-to-Network Relay. For Unstructured PDU Session Type, the Remote UE info contains the PDU session ID. The SMF stores the Remote User IDs and the related Remote UE info (if available) in the ProSe 5G UE-to-Network Relay's SM context for this PDU session associated with the relay.

For IP info the following principles apply:
for IPv4, the UE-to-network Relay shall report TCP/UDP port ranges assigned to individual Remote UE(s) (along with the Remote User ID);
for IPv6, the UE-to-network Relay shall report IPv6 prefix(es) assigned to individual Remote UE(s) (along with the Remote User ID).

The Remote UE Report message shall be sent when the Remote UE disconnects from the ProSe 5G UE-to-Network Relay (e.g., upon explicit layer-2 link release or based on the absence of keep alive messages over PC5) to inform the SMF that the Remote UE(s) have left.

In the case of Registration Update procedure involving SMF change the Remote User IDs and related Remote UE info corresponding to the connected Remote UEs are transferred to the new SMF as part of SM context transfer for the ProSe 5G UE-to-Network Relay.

In order for the SMF to have the Remote UE(s) information, the HPLMN and the VPLMN where the ProSe 5G UE-to-Network Relay is authorised to operate, needs to support the transfer of the Remote UE related parameters in case the SMF is in the HPLMN.

After being connected to the ProSe 5G UE-to-Network Relay, the Remote UE keeps performing the measurement of the signal strength of PC5 unicast link with the ProSe 5G UE-to-Network Relay for relay reselection.

The procedure disclosed in FIG. 12 may also be used when the ProSe UE-network relay UE is connected to an evolved packet system (EPS) using LTE.

The SMF needs to support the Remote UE reporting procedure, and the UE must support the procedure for the remote UE and ProSe 5G UE-to-Network Relay.

The proposed method to support multicast to the Remote UE consists of a combination of one or more of the following operations/configurations/steps.

Problems to be Solved in the Disclosure of this Specification

In a multicast method, a remote UE may communicate with a network through a relay. A Relay UE may relay to multiple remote UEs so that the remote UEs can communicate with the network. At this time, there has been no discussion in the past as to who manages the join request and leave request for the multicast group from the relay UE and a plurality of remote UEs.

Disclosure of the Present Specification

The disclosures described below in this specification may be implemented in one or more combinations (e.g., a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementary.

In this specification, the Multicast-Broadcast Service (MBS) may be interpreted in the same way as the Multimedia Broadcast/Multicast Service (MBMS).

In the present specification, the MBS session may be interpreted as including an MBS multicast session and an MBS broadcast session, and MBS data may be interpreted as including MBS multicast data and MBS broadcast data.

In this specification, a multicast session, a multicast service, and a multicast group may be used interchangeably, and these may be abbreviated as multicast.

In this specification, user equipment (UE) and a terminal are mixed and described. Also, UE-to-Network Relay, ProSe UE-to-Network Relay, Relay, Relay UE, UE-NW Relay, 5G ProSe UE-to-Network Relay, 5G ProSe UE-to-NW Relay, 5G ProSe UE-to-Use a mix of Network Relay UE, etc. In addition, Remote UE, 5G Remote UE, etc. are mixed and used.

In this specification, a request for the UE to receive a multicast service to the network is used in combination with a join request, and a request for the UE to stop receiving a multicast service from the network is used interchangeably with a Leave request. The above Join request and Leave request may be for a specific multicast service/group/session or may be for all multicast services/group/session.

The UE-to-Network Relay may explicitly or implicitly inform that multicast service provision/relay is possible through various information at various times. This information may affect the Remote UE to perform (re)selection of the Relay UE. Examples of such information may be as follows, and the UE-to-Network Relay may inform that multicast service provision/relay is possible by including one or more pieces of information.

i) Information that multicast service provision/relay is possible
ii) DNN+S-NSSAI-related information that can request Join/Leave and/or code information implied by such DNN+S-NSSAI
iii) Specific multicast service/group/session-related identification information (e.g., TMGI, multicast session ID, multicast context ID, multicast session context ID, etc.)
iv) Layer-2 ID information used to transmit a specific multicast service/group/session over the PC5 interface:

This may be a Destination Layer-2 ID and/or a Source Layer-2 ID. This may be in the form of information mapped to the information in iii) above.

Informing the UE-to-Network Relay that multicast service provision/relay is possible may be based on that remote UE (This may be a UE that has not yet formed one-to-one communication (or an L2 link or a PC5 unicast link) with the Relay, or it may be a UE that has already been formed) requests or may be or not In this specification, TMGI, multicast session ID, multicast context ID, multicast session context ID, and the like are mixed and used as multicast service/group/session-related identification information.

The following drawings were created to explain a specific example of the present specification. The names of specific devices described in the drawings or the names of specific signals/messages/fields are presented by way of example, so that the technical features of the present specification are not limited to the specific names used in the following drawings.

1. First Disclosure

Figure 13:
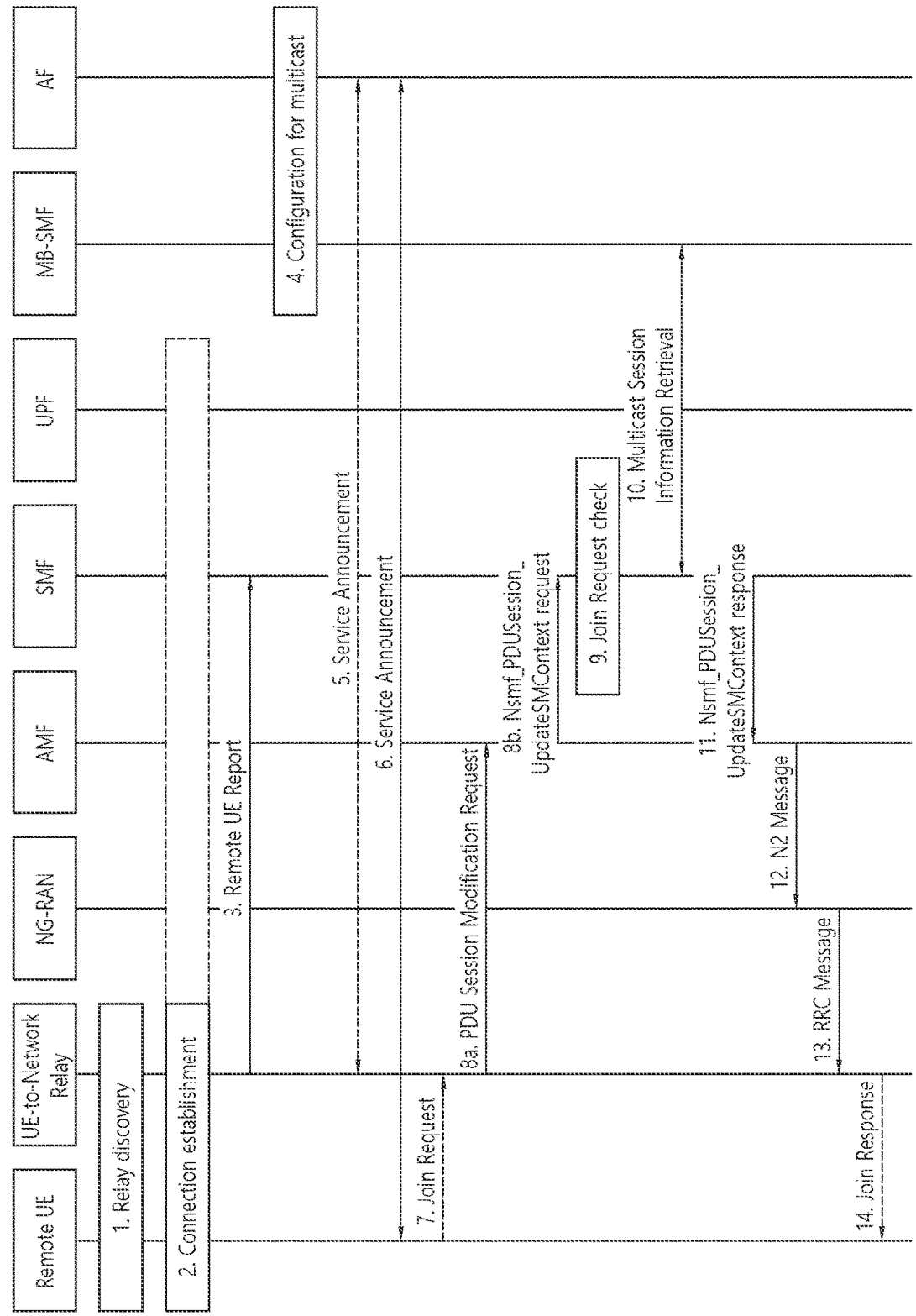
FIG. 13 shows a first disclosure of the present specification.

FIG. 13 shows a first disclosure of the present specification.

FIG. 13 illustrates a process in which a Session Management Function (SMF) processes a Join request of a UE-to-Network Relay or a Remote UE.

The UE-to-Network Relay may explicitly or implicitly inform the network that multicast service provision or relay is possible through various information at various times.

1. A Remote UE may discover a UE-to-Network Relay to receive a network connection service and may select the discovered UE-to-Network Relay.
2. The Remote UE may establish a link with the UE-to-Network Relay.

The link may be for unicast communication.

3. The UE-to-Network Relay may transmit a Remote UE Report (Remote User ID, Remote UE info) message about the remote UE served by the UE-to-Network Relay to the SMF.

The SMF may store the Remote User ID and Remote UE info in the session management context of the UE-to-Network Relay based on the received remote UE report.

The Remote User ID is the identity of the Remote UE user. Remote UE info may be used to identify a Remote UE in 5GC and may include the following information according to the type of PDU session for providing a network connection service to the Remote UE.

In case of IP PDU session type, Remote UE info is IP information of Remote UE

In case of Ethernet PDU session type, Remote UE info is Remote UE MAC address

In case of Unstructured PDU Session Type, Remote UE info is PDU Session ID

For detailed operations of steps 1 to 3, refer to FIG. 12.

4. The AF (application function) may configure the multicast session to start the multicast session to 5GC.

Due to this, MB-SMF serving this multicast session is determined, and necessary user plane resources may be reserved and allocated.

5. If the UE-to-Network Relay does not relay the traffic for the multicast session to the Remote UE, but the UE-to-Network Relay itself wants to receive the multicast session and can receive the multicast session, AF may perform service announcement to UE-to-Network Relay. This may be performed through application layer signaling, and AF may provide MBS session related information such as MBS session ID such as TMGI, service/session description information, and QoS related information to the UE-to-Network Relay. Steps 4 to 5 may be performed before steps 1 to 3 or in parallel.

6. AF may perform service announcement to the Remote UE. This may be performed through application layer signaling. AF may provide MBS session-related information such as MBS session ID such as TMGI, service/session description information and QoS-related information to the Remote UE.

7. If the Remote UE wants to join the multicast session/group, the Remote UE may send a Join request for the multicast session/group to the UE-to-Network Relay. The join request may use a PC5-S message, or other PC5 messages or a PC5 user plane. When a join request is made using a PC5 user plain, the join request may be regarded as special user traffic or signaling through a user plane.

The Join request may include an MBS session ID (e.g., TMGI), which is identification information for identifying a multicast session/group.

The Join request of the Remote UE may mean that the UE-to-Network Relay that has received it requests to transmit/deliver the Join request of the Remote UE to the SMF.

8. When the UE-to-Network Relay wants to join the multicast session/group or receives a join request from the Remote UE as in step 7, the UE-to-Network Relay sends join request for a multicast session/group to the SMF. The join request may include an MBS session ID (e.g., TMGI), which is identification information for identifying a multicast session/group.

When the Remote UE makes a join request (or makes a Join request for the Remote UE), the UE-to-Network Relay include information about the Remote UE (at least one of information indicating that it is an SM NAS message for the Remote UE, information indicating that the Remote UE has joined a multicast session/group, Remote UE ID/identification information and the IP address of the Remote UE) to the message sent to the SMF.

Even if the Remote UE has already made a Join request to the network for the same multicast session/group previously, the Remote UE may make a join request again when the remote UE is provided through this UE-to-Network Relay. (Directly connected to the network or via another UE-to-Network Relay)

A PDU session in which the UE-to-Network Relay provides a network connection service to a Remote UE or another PDU session in the UE-to-Network Relay is a PDU session that can send a Join request and a Leave request to the SMF.

9. When the SMF receives an SM NAS message (e.g., a PDU session modification request) including a Join request from the UE-to-Network Relay, the SMF may perform the following operation.

A) The SMF may determine/check whether the UE requesting Join is a UE-to-Network Relay or a Remote UE. If the UE requesting Join corresponds to a UE-to-Network Relay or a Remote UE, B) can be performed.

B) SMF may check whether UE-to-Network Relay UE or a specific remote UE from among the Remote UE(s) served by the UE-to-Network Relay has previously made a Join request for the multicast session/group. That is, SMF may check whether the Join request corresponds to the first Join request for the multicast session/group among the UE-to-Network Relay and the Remote UE(s) receiving the network connection service from the UE-to-Network Relay. As such, the collection/set/set/group of UEs that determine whether to receive the first join request for any multicast session/group may be UE-to-Network Relay and Remote UE(s) served by the UE-to-Network Relay. More specifically, it may correspond to one of the following.

I) UE-to-Network Relay and Remote UE(s) receiving a network connection service from the UE-to-Network Relay may use/share the same single PDU session.

II) The UE-to-Network Relay uses the first PDU session, and the Remote UE(s) receiving the network connection service from the UE-to-Network Relay uses the second PDU session, the first PDU session and the second PDU session may be for receiving the same service. Whether the first PDU session and the second PDU session are for the same service may be identified by a combination of DNN and S-NSSAI.

III) UE-to-Network Relay and Remote UE(s) receiving network connection service from the UE-to-Network Relay use one PDU session for each UE, and each PDU session corresponding to each UE may be for receiving the same service.

The SMF may know about which Remote UE receives the network connection service from which UE-to-Network Relay, based on step 3. Alternatively, the UE-to-Network Relay may provide Remote UE information to the network.

The SMF may check, verify, or verify whether the UE-to-Network Relay can relay the traffic for the multicast session/group to the Remote UE through the interaction with the SMF or another NF (network function). The aforementioned check or confirmation or verification may be additional to the check or confirmation or verification of whether the UE making the join request can receive the multicast service.

10. If the SMF does not have the context and information for the multicast session and group requested to join, the SMF may be obtained from MB-SMF.

11. If the SMF has performed B) in step 9, the N2 SM information may be included in the message transmitted to the NG-RAN through the AMF only in the case of the first join request. Only for the first join request among join requests of a collection/set/set/group of UEs corresponding to any multicast session/group, context related to multicast session/group is provided. That is, this is for the SMF to provide context related to multicast session/group once. This context may be provided to the NG-RAN in relation to the UE-to-Network Relay.

The N2 SM information for traffic transmission for a multicast session/group:
  i) When the multicast transmission method is used, it may include multicast-related information/context (including information on multicast QoS Flow),
  ii) When the unicast transmission method is used, it may include unicast-related information (information on dedicated QoS flow).

When the NG-RAN receives the N2 SM information, it may reserve and allocate user plane resources for multicast-related traffic transmission to the UE-to-Network Relay.

The SMF may store i) whether a join request is received for a collection/set/set/group of UEs corresponding to the multicast session/group and/or ii) whether the SMF provides the multicast session/group-related context to the NG-RAN. The SMF may also store all information on UEs that have made a join request.

When the Remote UE requests a join and the UE-to-Network Relay performs step 8a, the SMF may include the N1 SM container in the message transmitted to the AMF, and additionally information about the Remote UE (This may include information indicating that it is an SM NAS message for the Remote UE, information indicating that the Remote UE has joined a multicast session/group, Remote UE ID/identification information, and one or more of the IP address of the Remote UE). That is, conventionally, the following information is included in the N1 SM container, and information on the above-described Remote UE may be additionally included here.

PDU session modification command (PDU session ID, multicast information ([multicast context ID], multicast address))

When the Remote UE requests a Join and the UE-to-Network Relay performs step 8a, the SMF may not transmit an SM NAS message response to the UE-to-Network Relay.

The SM NAS message transmitted by the SMF to the UE may be an extension of an existing SM NAS message or may be a newly defined SM NAS message. This may apply throughout this specification.

As a result of performing B) in step 9 by SMF, if it is determined that the join request is the first join request and the unicast transmission method is used for traffic transmission for multicast sessions/groups. SMF may perform Multicast reception related configuration to UPF before step 11.

12. AMF may transmit a message received from SMF to NG-RAN.
13. When the UE-to-Network Relay receives an N1 SM container (SM NAS message) and the N1 SM container includes information about the Remote UE, the UE-to-Network Relay may perform one or more of the following actions:
a) When UE-to-Network Relay performs relay-transmission of multicast session/group related data/traffic to Remote UE (i.e., when transmitting through PC5 interface), operation to add PC5 QoS Flow(s) to be used to PC5 unicast link may be performed by modifying the PC5 unicast link with the Remote UE using a PC5-S message and/or a PC5-RRC message, performing a) is, when the UE-to-Network Relay receives the multicast session/group related data/traffic from the network, for transmitting the multicast session/group related data/traffic to the Remote UE in unicast form (or Point-to-Point (PtoP) method).
b) When the UE-to-Network Relay relays and transmits multicast session/group related data/traffic to the Remote UE (i.e., when transmitting through the PC5 interface), Layer-2 ID information to be used (this is the Destination Layer-2 ID and/or may be a Source Layer-2 ID) may be provided. This may be provided using a PC5-S message or may be provided using a PC5-D message. When the UE-to-Network Relay relays and transmits multicast session/group related data/traffic to the Remote UE (that is, when transmitting through the PC5 interface), information on the PC5 QoS Flow(s) to be used (this includes PC5 QoS parameters for PC5 QoS Flow) may be provided. The information on the PC5 QoS Flow(s) may include PC5 QoS parameters for the PC5 QoS Flow, performing b) is, when the UE-to-Network Relay receives the multicast session/group related data/traffic from the network, for transmitting the multicast session/group related data/traffic to all Remote UE(s) in the form of groupcast or multicast or Point-to-Multipoint (PtoM). Accordingly, if the UE-to-Network Relay already has Layer-2 ID information allocated in relation to the multicast session/group (as another Remote UE has already joined the multicast session/group), it may be provided to the Remote UE.

In a) and b), the QoS information related to the PC5 QoS Flow(s) may be based on information mapped from the QoS information related to the Uu QoS Flow(s) provided by the SMF. The SMF may provide the QoS information itself related to the PC5 QoS Flow(s) to the UE-to-Network Relay. The Uu QoS Flow(s) may be a QoS Flow(s) to be used when transmitting the multicast session/group related data/traffic in the network.

When the UE-to-Network Relay transmits data/traffic for a certain multicast session/group to the Remote UE(s) through the PC5 interface, either the PtoP method or the PtoM method may be used. It is possible to determine and perform switching between the two transmission methods based on conditions and situations. The conditions and situations may vary. As the above conditions and situations, for example, the number of remote UEs joined to the same multicast session/group, network indication, the number of serving Remote UEs, and the number of multicast sessions/groups provided by relay may vary. This may apply throughout this specification. If the number of Remote UEs joining the same multicast session/group exceeds the threshold, UE-to-Network Relay may use the PtoM method or the PtoP method.

The UE-to-Network Relay may store necessary information to provide a multicast service to the Remote UE. The information may include information on whether to relay to a specific Remote UE for a specific multicast session/service/group.

14. If step 7 is performed, the UE-to-Network Relay may transmit a response to the Join request to the Remote UE.

The response may use a PC5-S message. Alternatively, other PC5 messages may be used. Alternatively, the PC5 user plane may be used. When using the PC5 user plane, the Join response may be regarded as special user traffic or signaling through the user plane.

The response may include an MBS session ID (e.g., TMGI) that is identification information for identifying a multicast session/group.

When the UE-to-Network Relay receives data/traffic for the multicast session/group from the network, the UE-to-Network Relay may transmit it to the Remote UE through the PC5 interface. Such transmission may be by a PtoP method or a PtoM method. The UE-to-Network Relay may receive data/traffic of the multicast session/group for the Remote UE from the network regardless of whether it joins itself, and deliver it to the remote UE.

2. Second Disclosure

Figure 14:
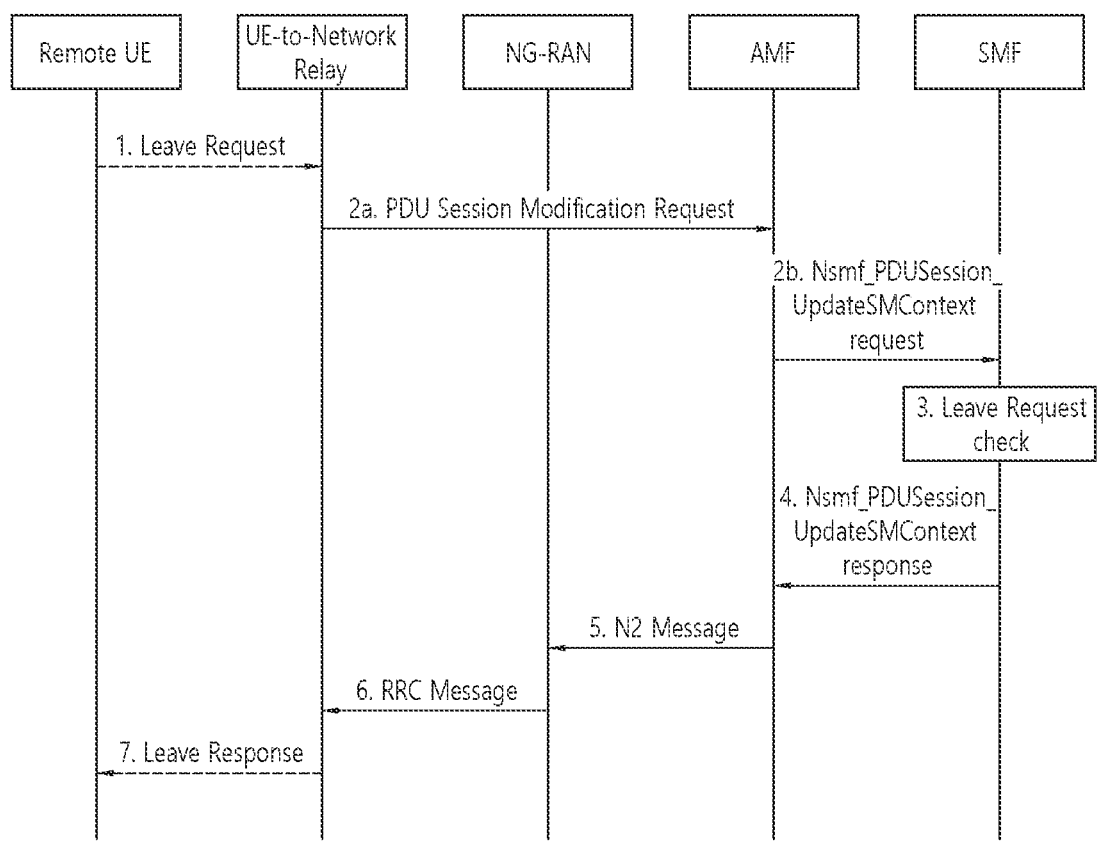
FIG. 14 shows the second disclosure of this specification.

FIG. 14 shows the second disclosure of this specification.

FIG. 14 shows a process in which a session management function (SMF) processes a leave request of a UE-to-Network Relay or a remote UE.

It is assumed that UE-to-Network Relay and/or Remote UE(s) are receiving multicast service by joining multicast session/group.

1. When a Remote UE wishes to leave from a multicast session/group, the Remote UE may transmit a leave request for the multicast session/group to the UE-to-Network Relay. The leave request may use a PC5-S message, other PC5 messages, or a PC5 user plane (which may consider the leave request as special user traffic or signaling through a user plane). In the case of using the PC5 user plane, the leave request may be regarded as special user traffic or signaling through the user plane.

The leave request may include an MBS session ID (e.g., TMGI), which is identification information for identifying a multicast session/group.

The leave request may include an instruction for the UE-to-Network Relay to transmit a leave request of the remote UE to the SMF.

2. When a leave request is received from a remote UE, the UE-to-Network Relay may transmit the leave request for a multicast session/group to the SMF. Even when the UE-to-Network Relay wants to leave from the multicast session/group itself, the UE-to-Network Relay may send a leave request for the multicast session/group to the SMF. The leave request may include an MBS session ID (e.g., TMGI), which is identification information for identifying a multicast session/group.

The UE-to-Network Relay may include the leave request in an SM NAS message and transmit it to the SMF.

When making a Leave request for a Remote UE, the UE-to-Network Relay may include information about the Remote UE in a message transmitted to the SMF. The information about the Remote UE includes one or more of information indicating that it is an SM NAS message for the Remote UE, information indicating that the Remote UE leaves the multicast session/group, Remote UE ID/identification information, and IP address of the Remote UE.

It is assumed that a PDU session in which UE-to-Network Relay provides network connection services to remote UEs or another PDU session in UE-to-Network Relay is a PDU session in which Join Request and Leave Request may be transmitted to SMF.

3. i) When an SM NAS message (e.g., PDU session modification request) including a Leave request transmitted by UE-to-Network Relay is received or ii) when SMF recognizes a situation in which the Remote UE no longer receives network connection services from the UE-to-Network Relay because the remote UE (which has joined the multicast session/group) leaves from the UE-to-Network Relay, the SMF may perform the following operation.

A) SMF may perform following B when the received leave request is for UE-to-Network Relay or Remote UE.

B) The SMF may check whether the UE making the leave request is the last UE receiving the multicast service among the UE-to-Network Relay and the Remote UE(s) served by the UE-to-Network Relay for the multicast session/group. If the UE making the leave request is the UE receiving the last multicast service in the multicast session/group, ending with the UE, the SMF may no longer need to provide services to the UE-to-Network Relay or to the Remote UE(s) served by this Relay for the multicast session/group. In this way, whether the UE is the last UE receiving multicast service for which multicast session/group in the collection/set/set/group of the UE-to-Network Relay and the Remote UE(s) served by the UE-to-Network Relay may be determined. More specifically, it may correspond to one of the 9 steps I) to III) described in FIG. 13. Alternatively, the collection/set/set/group of UEs may be regarded as the same as the collection/set/set/group of UEs for determining whether an initial join request is received for a multicast session/group.

Information on which UE-to-Network Relay provides a network connection service to a specific Remote UE may be based on step 3 of FIG. 13. Or it may be based on information provided to the network by the UE-to-Network Relay.

4. As a result of checking in step B in step 3, only when the UE sending the leave request is the last UE receiving the service, the SMF may transmit a message including the N2 SM information transmitted to the NG-RAN to the AMF. That is, as a result of checking in step 3, only when the UE sending the leave request is the last UE receiving the service, N2 SM information may be included in the message transmitted by the SMF to the AMF. Therefore, when it is finally determined that the UE is the last UE receiving the service for a multicast session/group among the collection/set/set/group of UEs, the SMF may transmit information for releasing the QoS Flow-related context (or QoS Flow) sent to the NG-RAN only once. This information for releasing context may be provided to the NG-RAN in relation to UE-to-Network Relay.

When the multicast transmission method was used to transmit traffic for a multicast session/group, the N2 SM information may include information for releasing the multicast-related context. And, when the unicast transmission method was used, the QoS Flow-related context (or QoS Flow) may include information for releasing.

When the NG-RAN receives the N2 SM information, the NG-RAN may release user plane resources reserved and allocated for transmission of multicast-related traffic to the UE-to-Network Relay.

The SMF may store information of the UE that sent the leave request, whether the UE is the last UE receiving the multicast service in the multicast session/group, and whether information for releasing context related to the multicast/QoS flow was provided.

If the Remote UE requests Leave, the SMF may transmit an SM NAS message to provide information on the Remote UE to the UE-to-Network Relay. The information on the Remote UE may include one or more of information indicating that it is an SM NAS message for the Remote UE, information indicating that the Remote UE has left the multicast session/group, Remote UE ID/identification information, and IP address of the Remote UE. The information on the Remote UE may include all information required to notify that the Remote UE has left a certain multicast session/group.

If, as a result of checking in step 3, if the UE sending the leave request is not the last UE receiving the service, the SMF may not transmit N2 SM information to the NG-RAN. That is, step 4 may not be performed. Alternatively, if the SMF does not need to transmit N2 SM information to the NG-RAN and does not need to transmit SM NAS messages to the UE-to-Network Relay, step 4 may not be performed.

If the Remote UE requests Leave (i.e., if the UE-to-Network Relay performed step 2a by step 1), the SMF may not send an SM NAS message response to the UE-to-Network Relay.

5. The AMF may transmit the message received from the SMF to the NG-RAN.

6. When the NG-RAN receives the message including the N2 SM information, the NG-RAN may release user plane resources reserved and allocated for transmission of multicast-related traffic to the UE-to-Network Relay.

When the UE-to-Network Relay receives an N1 SM container (SM NAS message) and it contains information on the Remote UE, the UE-to-Network Relay performs one or more of the following actions.
- a) If the PC5 QoS Flow(s) is added to the PC5 unicast link to relay and transmit the multicast session/group related data/traffic to the Remote UE, the UE-to-Network Relay may perform operation for removing the PC5 QoS Flow(s) from the PC5 unicast link. The UE-to-Network Relay may modify the PC5 unicast link with the Remote UE using the PC5-S message and/or the PC5-RRC message.
- b) UE-to-Network Relay may release Layer-2 ID information (e.g., Destination Layer-2 ID, Source Layer-2 ID) used when relaying and transmitting the multicast session/group related data/traffic to the Remote UE. When the last Remote UE leaves from the multicast session/group, the UE-to-Network Relay may perform an operation notifying the Remote UE that the multicast session/group-related multicast/groupcast is released. The UE-to-Network Relay may provide the remote UE with the above-described release information through a PC5-S message or a PC5-D message.

7. The UE-to-Network Relay may transmit a response to the leave Request to the Remote UE.

To this end, a PC5-S message may be used, other PC5 messages may be used, or a PC5 user plane may be used. When the PC5 user plane is used, the leave response may be regarded as special user traffic or signaling through the user plane.

The leave response may include an MBS session ID (e.g., TMGI), which is identification information for identifying a multicast session/group.

In the first and second disclosures, although information such as whether a UE-to-Network Relay and Remote UE(s) served by the UE-to-Network Relay join or leave from a multicast group/session/service was described as being stored/managed by the SMF, other NFs (e.g., MB-SMF, MBSF, UDM, UDR, etc.) may store/manage differently or together.

3. Third Disclosure

In the first disclosure, the SMF receives a Join request from a UE-to-Network Relay or a Remote UE, and the SMF may determine whether the join request is the first join request in a multicast session/group.

In the third disclosure, when the UE-to-Network Relay attempts to make a join request to the multicast session/group or receives a join request from a remote UE, the UE-to-Network Relay may determine whether there has been a join request for the multicast session/group before or not.

The contents of steps 1 to 7 are replaced with the contents of the first disclosure.

8. When the UE-to-Network Relay requests to join for itself or receives a join request from a remote UE for the multicast session/group to be joined, the UE-to-Network Relay may check whether there already has been join request from any UE among the UE-to-Network Relay and remote UE(s) for the multicast session/group. That is, the UE-to-Network Relay may checked whether the join request is the first case in which a join request is made for the multicast session/group by any UE among the UE-to-Network Relay and Remote UE(s) receiving network connection service from the UE-to-Network Relay. If the join request is the first join request, it may be interpreted as the first multicast service request for a multicast session/group.

That is, the UE-to-Network Relay may perform B) performed by the SMF in step 9 of the first disclosure.

If the join request is the first join request, the UE-to-Network Relay may include information indicating that the join request is the first join request in the join request transmitted to the SMF. This information may be explicit or implicit.

The UE-to-Network Relay may store whether a join request has been received for a collection/set/set/group of UEs that determines whether an initial join request has been received for any multicast session/group or not.

9. When the SMF receives a join request including information indicating that the join request is the first join request from the UE-to-Network Relay, the SMF may determine that the join request is the first join request for the multicast session/group.

Subsequent steps are replaced with the contents of the first disclosure.

4. Fourth Disclosure

In the second disclosure, the SMF receives a leave request from a UE-to-Network Relay or a Remote UE, and the SMF determines whether the UE performing the leave request corresponds to the last UE receiving the multicast service.

In the fourth disclosure, when a UE-to-Network Relay attempts to make a leave request to a multicast session/group or receives a leave request from a remote UE, The UE-to-Network Relay may determine whether the UE to leave corresponds to the last UE that receives the multicast service.

Step 1 is replaced by the contents of the second disclosure.

2. If the UE-to-Network Relay requests Leave or receives a Leave request from a Remote UE. The UE-to-Network Relay may determine whether the UE to leave corresponds to the last UE that receives the multicast service.

That is, the UE-to-Network Relay may check whether service for the multicast session/group is no longer needed for Remote UE(s) served by this Relay.

That is, the UE-to-Network Relay may perform B) performed by the SMF in step 3 of the second disclosure described above.

When the last serviced UE leaves, the UE-to-Network Relay may include information (indicating that the leave request is the last leave request) and/or information (indicating that the last serviced UE is leaving) to the Leave request transmitted to the SMF. This information may be explicit or implicit.

When a Remote UE no longer receives network connection service and a multicast session/group that the Remote UE joined still exist, the UE-to-Network Relay may send a Leave Request to SMF. Unlike this, if i) the Leave request for the Remote UE is not transmitted to the SMF, but ii) the Remote UE is the last UE that was receiving the service, the UE-to-Network Relay may transmit, to the SMF, a notification report (which may use a PDU Session Modification Request message or another SM NAS message) that the Remote UE is no longer receiving the network connection service and the UE-to-Network Relay may include i) information (indicating the last leave request) and/or ii) information (indicating that the last UE that was receiving the service is leaving) to the notification report. Along with the above information, an MBS session ID (e.g., TMGI), which is identification information for identifying a multicast session/group, may be included.

4. When the SMF receives information indicating that a leave request is the last leave request and/or information indicating that the last serviced UE is leaving, the SMF may judge that the last serviced UE is leaving for the multicast session/group.

In the first to fourth disclosures, when the UE-to-Network Relay transmits a join request or a leave request to the network, a plurality of UE information (UE-to-Network Relay information and/or information about one or more Remote UEs) may be included in the join request or the leave request.

In the first to fourth disclosures, the Remote UE transmits a Join/Leave request to the network or the UE-to-Network Relay transmits the Join/Leave request to the network on behalf of the Remote UE. Alternatively, Join/Leave of Remote UE may be performed implicitly. To this end, the following method may be used, and the NF (i.e., SMF) that recognizes the Join or Leave of the Remote UE may perform the first to second disclosures operations.

When the UE-to-Network Relay transmits a report about the Remote UE to the network, the network may determine Join or Leave of the Remote UE based on this. The report may be in the form of a Remote UE report, but is not limited thereto. The UE-to-Network Relay may transmit the report to the network when it serves a Remote UE or when it no longer serves. The report may be transmitted to SMF, AMF, or other NF. Eventually, the contents of the report may be explicitly or implicitly delivered to the NF that manages join/leave to the multicast group of the UE-to-Network Relay and the Remote UE(s) served by the UE-to-Network Relay. When it comes to serve a Remote UE, it may be considered that the Remote UE has joined one or more multicast groups, and when it no longer serves a Remote UE, it may be considered that the Remote UE has left one or more multicast groups. The UE-to-Network Relay may include multicast group information in the report when transmitting the report, or may include information indicating that the relay itself joins or leaves multicast.

Figure 15:
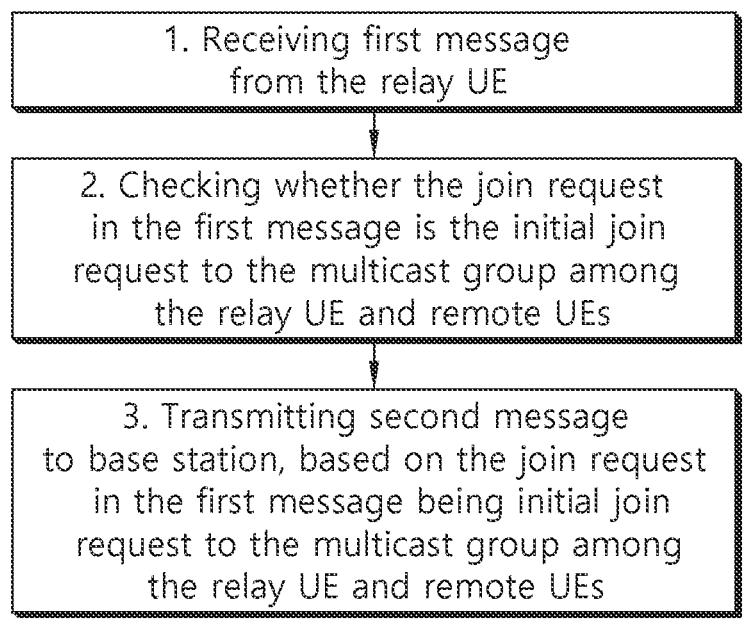
FIG. 15 shows a procedure of SMF according to the first disclosure of the present specification.

FIG. 15 shows a procedure of SMF according to the first disclosure of the present specification.

1. The SMF may receive, from a relay UE (User Equipment), a first message,

If the relay UE receives a join request of a first remote UE for multicast group from the first remote UE, the first message may include i) the join request of the first remote UE and ii) information on the first remote UE.

Alternatively, even if there is no join request from the remote UE, if the relay UE itself wants to receive the multicast service, the relay UE itself may request to join the multicast group. In that way, the relay UE may include the relay UE's join request in the first message and transmit it to the SMF. That is, the relay UE may transmit the first message to the SMF when the remote UE wants to join the multicast group or when the relay UE itself wants to join the multicast group. The first message may contain identifying information for the multicast group.

2. The SMF may check whether the join request (join request of the first remote UE or join request of the relay UE) included in the received first message is the first join request for the multicast group among the relay UE and one or more remote UEs serviced from the relay UE.

That is, before receiving the first message, the SMF may check whether the SMF has received a join request for the multicast group from among the relay UE and one or more remote UE(s) served by the relay UE.

3. The SMF may transmit a second message to the base station. As a result of checking by the SMF in step 2, if the join request included in the first message is the first join request for the multicast group among the relay UE and one or more remote UEs receiving a network connection service from the relay UE, the SMF may transmit a second message to the base station.

The second message may include a first multicast group-related context for the base station.

The second message may include first multicast-related information for the relay UE or the first remote UE.

The first multicast group-related context may include information on multicast QoS flow. The SMF may receive multicast group-related context and information from the MB-SMF. Based on this, the SMF may transmit the context related to the first multicast group to the base station.

The base station may receive the second message from the SMF. The base station may transmit the first multicast-related information included in the second message to the relay UE.

The relay UE may receive the first multicast related information.

If the first remote UE has requested to join the multicast group, the relay UE may transmit a first response message to the first remote UE based on the first multicast-related information. Furthermore, the relay UE may relay a multicast service for the first remote UE.

On the other hand, if the relay UE itself requests to join the multicast group, the relay UE may receive a multicast service based on the first multicast-related information.

Through steps 1-3, the UE receives the multicast service. A UE using the multicast service may request to leave for the multicast service.

Leave request may be performed by the remote UE or by the relay UE itself.

If the relay UE receives a leave request for the multicast group from the second remote UE, the relay UE may transmit a third message including second remote UE information and a leave request of the second remote UE to the SMF. In this case, the second remote UE is one specific remote UE among one or more remote UE(s) for which the relay UE relays the multicast service, and the second remote UE may be the same UE as the first remote UE described in steps 1-3.

In contrast, if the relay UE itself wants to leave the multicast service even if there is no leave request from the remote UE, the relay UE may itself request to leave the multicast group. In this way, the relay UE may include the leave request of the relay UE in the third message and transmit it to the SMF.

The leave request included in the third message may include identification information about the multicast group.

In the third message, the SMF determines whether the UE (the second remote UE or the relay UE) wishing to leave is the last UE receiving the multicast service from among the relay UE and one or more remote UE(s) receiving the network connection service from the relay UE.

As a result of the check, if the UE (second remote UE or relay UE) that wants to leave in the third message corresponds to the last UE receiving the multicast service among the relay UE and one or more remote UEs receiving the network connection service from the relay UE, A fourth message for releasing the multicast service may be transmitted to the base station.

The fourth message may include a second multicast group-related context for the base station.

The fourth message may include second multicast-related information for a relay UE or a second remote UE.

The base station may receive the fourth message from the SMF. The base station may transmit the second multicast-related information included in the fourth message to the relay UE.

The relay UE may receive second multicast-related information.

If the second remote UE has made a leave request for the multicast group, the relay UE may transmit a second response message to the second remote UE based on the second multicast-related information. The second response message may include information indicating that the multicast service is to be released.

Figure 16:
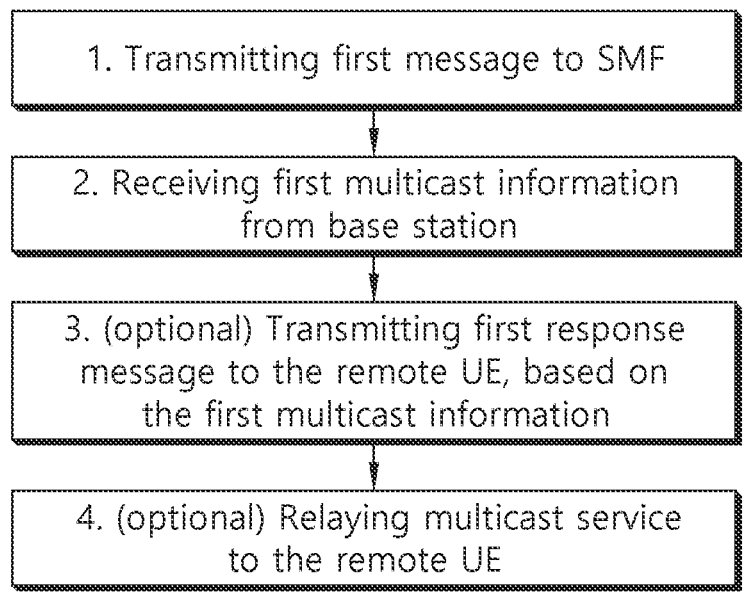
FIG. 16 shows a procedure of a relay UE according to the first disclosure of the present specification.

FIG. 16 shows a procedure of a relay UE according to the first disclosure of the present specification.

1. The relay UE may transmit the first message to SMF.

A description of this will be replaced with the description of step 1 of FIG. 15.

2. The relay UE may receive first multicast-related information from the base station.

As described in step 3 of FIG. 15, the SMF may transmit the second message to the base station.

The second message may include a first multicast group-related context for the base station.

The second message may include first multicast-related information for the relay UE or the first remote UE. The base station may transmit first multicast-related information to the relay UE.

3. The relay UE may transmit the first response message to the first remote UE.

In step 1, this step is performed only when the first remote UE requests the relay UE to join the multicast group.

The relay UE may transmit a first response message to the first remote UE based on the first multicast-related information.

4. When receiving a request to join the multicast group from the first remote UE, the relay UE may relay the multicast service to the remote UE.

Through steps 1-4, the UE may be provided the multicast service. A UE using the multicast service may perform a leave request for the multicast service.

A description thereof will be replaced with the contents of FIG. 15. Hereinafter, an apparatus for providing a multicast service in a wireless communication system according to some embodiments of the present specification will be described.

For example, a UE may include a processor, a transceiver and a memory.

For example, a processor may be configured to be operatively coupled with a memory and processor.

The transceiver transmits, to a SMF (Session Management Function), a first message, wherein, based on the relay UE receiving a join request of a first remote UE for multicast group from the first remote UE, the first message includes i) the join request of the first remote UE and ii) information on the first remote UE, wherein, based on the relay UE wanting to join the multicast group, the first message includes a join request of the relay UE; wherein the transceiver receives, from the SMF, a first multicast-related information; wherein the processor relays multicast service to the first remote UE, based on the relay UE receiving the join request of the first remote UE for multicast group from the first remote UE.

Hereinafter, a processor for providing mobile communication according to some embodiments of the present specification will be described.

The processor performs operation, which is comprising: receiving, from a relay UE (User Equipment), a first message, wherein, based on the relay UE receiving a join request of a first remote UE for multicast group from the first remote UE, the first message includes i) the join request of the first remote UE and ii) information on the first remote UE, wherein, based on the relay UE wanting to join the multicast group, the first message includes a join request of the relay UE: checking whether the join request of the first remote UE or the join request of the relay UE in the first message is the first join request for the multicast group among the relay UE and one or more remote UEs serviced from the relay UE; transmitting, to a base station, a second message, based on the join request of the first remote UE or the leave request of the relay UE in the first message being the first join request for the multicast group among the relay UE and the one or more remote UEs serviced from the relay UE.

Hereinafter, a non-volatile computer-readable medium storing one or more instructions for providing mobile communication m according to some embodiments of the present specification will be described.

According to some embodiments of the present disclosure, the technical features of the present disclosure may be directly implemented as hardware, software executed by a processor, or a combination of the two. For example, in wireless communication, a method performed by a wireless device may be implemented in hardware, software, firmware, or any combination thereof. For example, the software may reside in RAM memory, flash memory, ROM memory, EPROM memory, EEPROM memory, registers, hard disk, removable disk, CD-ROM, or other storage medium.

Some examples of a storage medium are coupled to the processor such that the processor can read information from the storage medium. Alternatively, the storage medium may be integrated into the processor. The processor and storage medium may reside in the ASIC. For another example, a processor and a storage medium may reside as separate components.

Computer-readable media can include tangible and non-volatile computer-readable storage media.

For example, non-volatile computer-readable media may include random access memory (RAM), such as synchronization dynamic random-access memory (SDRAM), read-only memory (ROM), or non-volatile random-access memory (NVRAM). Read-only memory (EEPROM), flash memory, magnetic or optical data storage media, or other media that can be used to store instructions or data structures. Non-volatile computer readable media may also include combinations of the above.

Further, the methods described herein may be realized at least in part by computer-readable communication media that carry or carry code in the form of instructions or data structures, and which can be accessed, read, and/or executed by a computer.

According to some embodiments of the present disclosure, a non-transitory computer-readable medium has one or more instructions stored thereon. The stored one or more instructions may be executed by a processor of the UE.

The stored one or more instructions cause the processor to perform operation, which is comprising: receiving, from a relay UE (User Equipment), a first message, wherein, based on the relay UE receiving a join request of a first remote UE for multicast group from the first remote UE, the first message includes i) the join request of the first remote UE and ii) information on the first remote UE, wherein, based on the relay UE wanting to join the multicast group, the first message includes a join request of the relay UE; checking whether the join request of the first remote UE or the join request of the relay UE in the first message is the first join request for the multicast group among the relay UE and one or more remote UEs serviced from the relay UE; transmitting, to a base station, a second message, based on the join request of the first remote UE or the leave request of the relay UE in the first message being the first join request for the multicast group among the relay UE and the one or more remote UEs serviced from the relay UE.

The specification may have various effects.

For example, through the procedures disclosed in this specification, 5GS may also provide support for multicast services to Remote UEs receiving network connection services through UE-to-Network Relay.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method for providing multicast service to multicast group, performed by a SMF (Session Management Function), comprising:
   receiving, from a relay UE (User Equipment), a first message requesting for multicast service for multicast group,
   wherein the multicast group includes the relay UE and at least one remote UE,
   wherein the relay UE relays communication between the at least one remote UE and a network,
   wherein, based on the relay UE receiving a request for multicast service from a first remote UE, the first message includes i) the request of the first remote UE and ii) information on the first remote UE,
   wherein, based on the relay UE wanting the multicast service, the first message includes a request for the multicast service of the relay UE;
   checking whether there has not been a UE, which performed a request for the multicast service, among the multicast group; and
   transmitting, to a base station, information for the multicast group only if there has not been a UE, which performed a request for the multicast service, among the multicast group.

2. The method of claim 1,
   wherein, based on that there has been a UE, which performed a request for the multicast service, among the multicast group, the SMF skip transmitting the information for the multicast group to the base station.

3. The method of claim 1,
   wherein the first message includes identification information for the multicast group.

4. The method of claim 1,
   wherein the information for the multicast group includes a context for the multicast group for the base station,
   wherein the information for the multicast group includes information on multicast QoS (Quality of Service) flow.

5. The method of claim 1,
   wherein the information for the multicast group obtained from MB-SMF (Multicast Broadcast Session Management Function).

6. The method of claim 1, further comprising:
   receiving, from the relay UE, a third message,
   wherein, based on the relay UE receiving a leave request for the multicast service from a second remote UE, the third message includes i) the leave request of the second remote UE and ii) information on the second remote UE,
   wherein, based on the relay UE wanting to leave the multicast service, the third message includes a leave request for the multicast service of the relay UE,
   checking whether a UE, which performed a leave request for the multicast service, is the last UE receiving the multicast service in the multicast group; and
   transmitting, to the base station, a fourth message for releasing the multicast service, based on that the UE, which performed a leave request for the multicast service, is the last UE receiving the multicast service in the multicast group.

7. The method of claim 6,
   wherein, based on that the UE, which performed a leave request for the multicast service, is not the last UE receiving the multicast service in the multicast group, the SMF skip transmitting the fourth message for releasing the multicast service.

8. The method of claim 6,
   wherein the leave request included in the third message includes identification information on the multicast group.

9. A SMF (Session Management Function) configured to provide multicast service to multicast group, the SMF comprising:
   a transceiver;
   a processor,
   wherein the processor performs operation comprising:
   receiving, from a relay UE (User Equipment), a first message requesting for multicast service for multicast group,
   wherein the multicast group includes the relay UE and at least one remote UE,
   wherein the relay UE relays communication between the at least one remote UE and a network,
   wherein, based on the relay UE receiving a request for multicast service from a first remote UE, the first message includes i) the request of the first remote UE and ii) information on the first remote UE,
   wherein, based on the relay UE wanting the multicast service, the first message includes a request for the multicast service of the relay UE;
   checking whether there has not been a UE, which performed a request for the multicast service, among the multicast group;
   transmitting, to a base station, information for the multicast group only if there has not been a UE, which performed a request for the multicast service, among the multicast group.

* * * * *